J. G. DAW.
RESILIENT WHEEL.
APPLICATION FILED APR. 6, 1909.

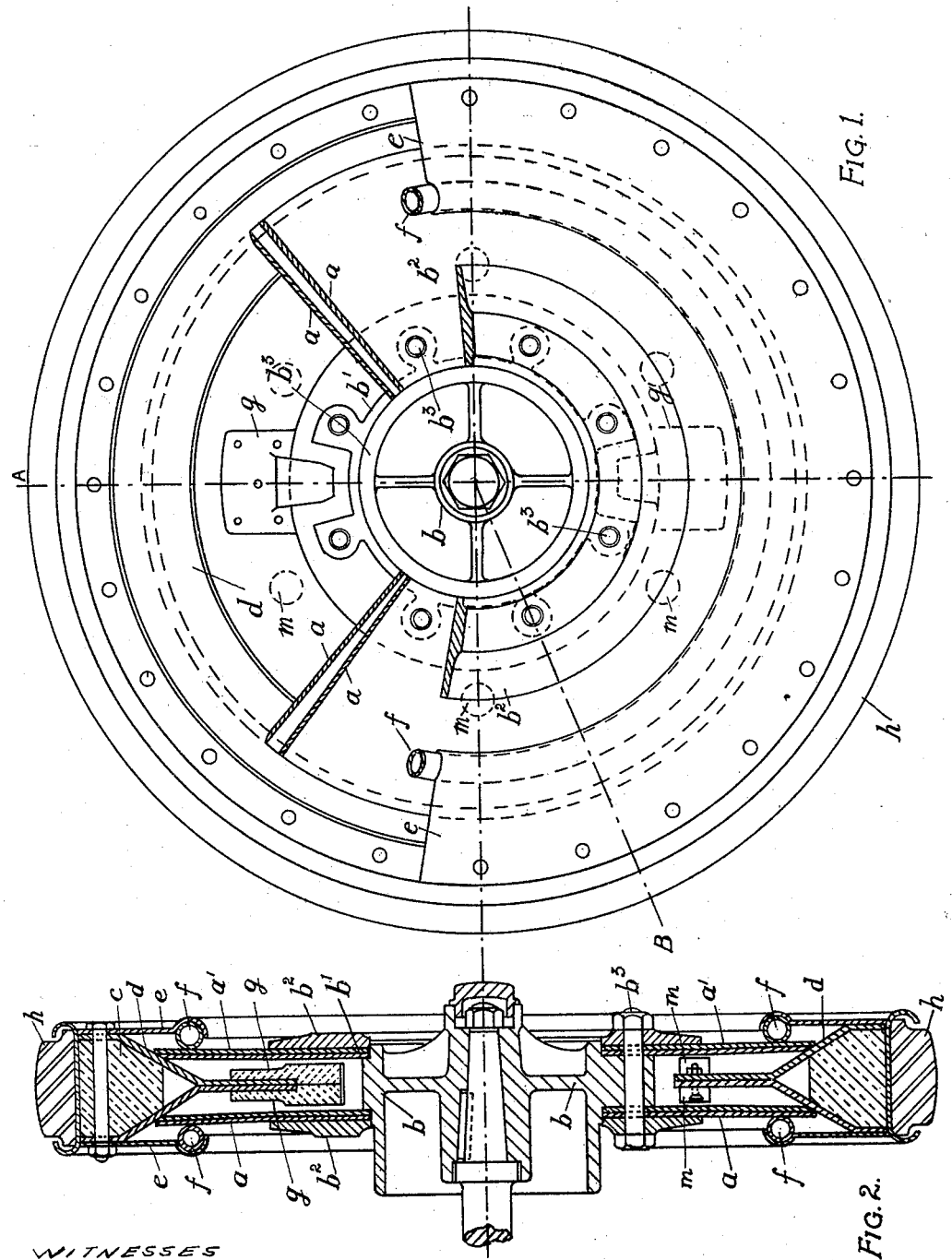

967,887.

Patented Aug. 23, 1910.
2 SHEETS—SHEET 2.

WITNESSES
W. P. Burke
R. R. Christie Jr.

INVENTOR
James Gilbert Daw

UNITED STATES PATENT OFFICE.

JAMES GILBERT DAW, OF WELLFIELD, LLANELLY, ENGLAND.

RESILIENT WHEEL.

967,887.  Specification of Letters Patent.  Patented Aug. 23, 1910.

Application filed April 6, 1909. Serial No. 488,316.

*To all whom it may concern:*

Be it known that I, JAMES GILBERT DAW, a subject of England, residing at Wellfield, Llanelly, in the county of Carmarthen, Wales, England, have invented new and useful Improvements in Resilient Wheels, of which the following is a specification.

The object of my invention is to construct non-pneumatic elastic wheels with which solid tires may be employed.

The nature of my invention will be better understood on reference to the accompanying sheet of drawings in which—

Figure 3:
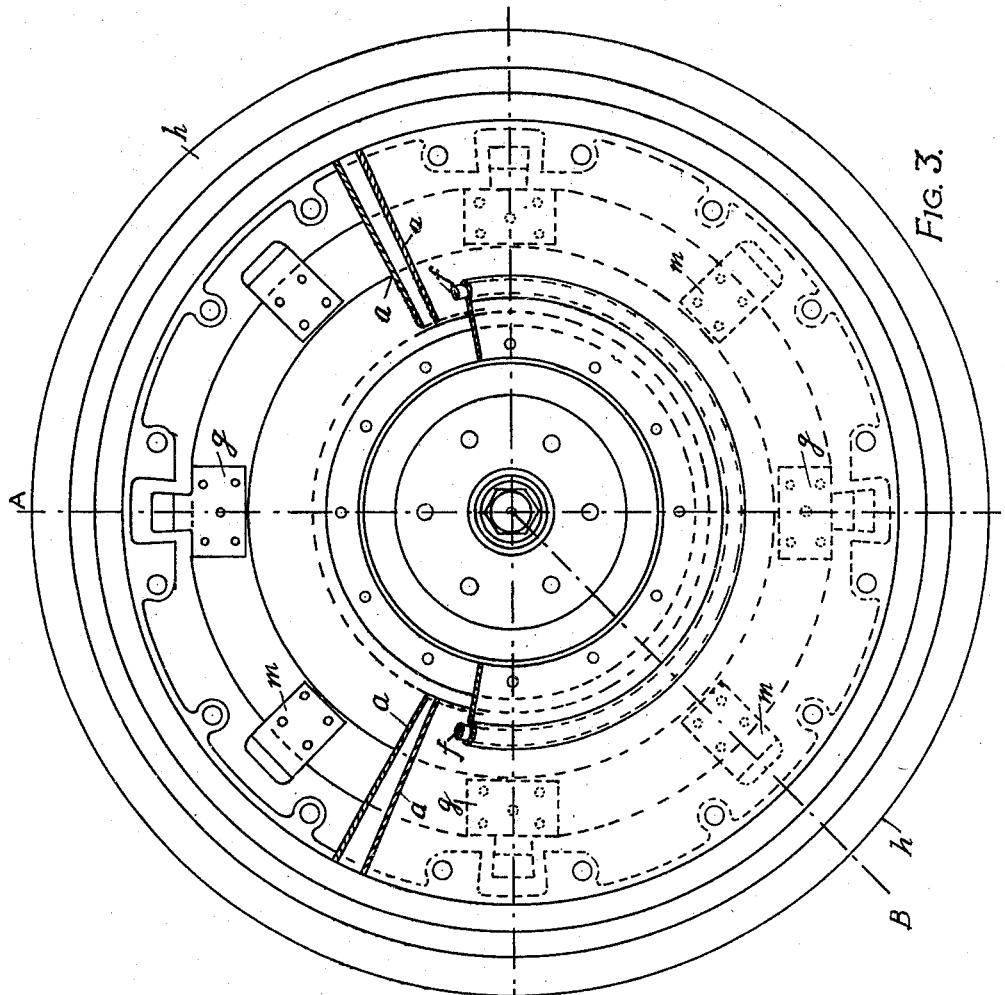
Figure 4:
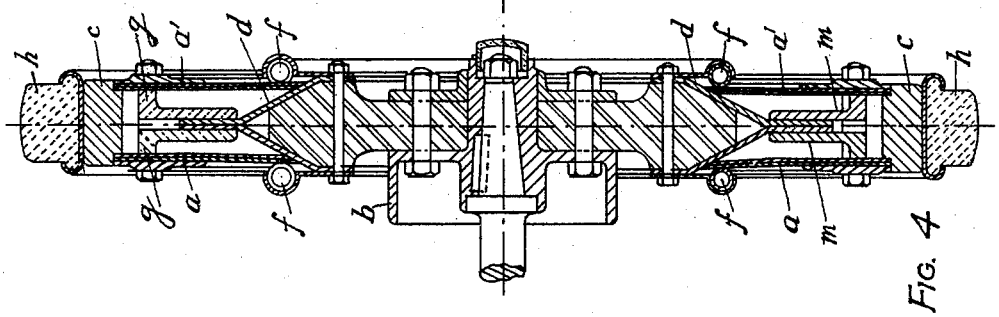

Figure 1, Sheet 1, is a side elevation of one of my improved wheels partly in section. Fig. 2, is a vertical and diagonal section through the same on the line A, B. Figs. 3, and 4, Sheet 2, Figs. 5 and 6, Sheet 3, and Figs. 3 and 4 are corresponding views of a modification.

The same letters refer to similar parts throughout the several views.

I carry out my invention by fastening firmly one or more circular plates of steel or other metal, $a$, $a^1$, on each side of a raised flange, $b^1$, on the boss, $b$, of the wheel by washer plates, $b^2$, and bolts, $b^3$. These plates, $a$, $a^1$, act as springs. The flange, $b^1$, it will be seen serves as a distance piece. The rim, $c$, of the wheel is quite separate from the boss and can be put on or taken off as required. On the inner side (smaller diameter) of the rim I secure a ring, $d$, which is V shape in section with the point of the V pointing to the center. This ring when in position acts as a wedge between the two springs, $a$, $a^1$, composed of the circular plates, which are fastened to the aforesaid flange, $b^1$. With a wheel constructed as here described it will be seen that when any unevenness on the road is met with, which shall cause a jerk or jolt, the ring, $d$, on the rim acting as a wedge between the two springs, $a$, $a^1$, will naturally relieve and soften such jolts or jerks. In addition to the foregoing, I fix two other flat rings, $e$, $e$, on to the sides of the rim for the purpose of holding pneumatic joint tubes, $f$, $f$, and keeping them tight against the sides of the circular plates. The purpose of these tubes is to prevent the dust from interfering with the lubrication.

$g$, $g$, are the lugs for providing independent means of giving motion from the axle through the boss, $b$, to the rim of the wheel, so that the spring members shall be free to give out the whole of their elastic effect for the purpose of cushioning and absorbing the shock. $m$, $m$, are guides to keep the rim at right angles with the axle, and $h$, is the solid india rubber tire.

It will be seen from the foregoing that the wedge part of the rim, $d$, bears upon the edges of the circular plate springs, $a$, $a^1$, at such an angle that when a jar or jolt takes place the wedge forces the spring apart in the bottom, when the weight takes effect thus relieving the shock and the reaction of the springs forces the rim back into its normal position.

The pneumatic joint tubes, $f$, $f$, are inflated so as to bear against the springs as shown, so that when the springs are distended or contracted, the section alters according to the pressure and then regain their original position when the springs have forced back the rim by acting on the V shaped or wedge sectioned rings.

As a modification of the arrangement herein described, instead of the circular spring plates, $a$, $a^1$, being fastened to a raised flange on the boss of the wheel and the ring, $d$, which acts as a wedge between them, being fastened to the rim of the wheel, I reverse the position of these parts by securing the wedge circular spring plates, $a$, $a^1$, being fastened to a raised flange on the rim of the wheel as shown in Figs. 3 and 4.

I am aware that wheels have been constructed in which spring action is obtained by means of disks and wedge shaped members. In such wheels, however, the rims have invariably been driven through the medium of the disk springs which are tightened either directly on to the sides of the rims or through the medium of balls, but in either case the respective parts have to be tightened to such an extent that to give the necessary resistance frictional or otherwise for the transmission of driving power the elastic effect of the springs is materially neutralized, and my within described invention is intended to obviate this by causing the springs to operate directly on the wedge shaped ring without any interference in order that they may give out the full extent of cushioning power.

What I do claim and desire to secure by Letters Patent, is,

1. A resilient wheel comprising a hub and a rim, circular spring plates secured to one of said portions, a V shaped ring secured to the other portion and fitting between the said plates, and means for driving the rim from the hub, said means being independent of the plates.

2. A resilient wheel comprising a hub and a rim, circular spring plates secured on each side of the hub, a V shaped ring secured to the inner side of the rim and fitting between the spring plates, and means independent of the spring plates for driving the rim from the hub.

3. A resilient wheel comprising a hub and a rim, circular spring plates secured on each side of the hub, a wedge shaped ring secured on the rim and having its inclined edges engaged by the edges of the spring plates, means for driving the ring from the hub independently of the spring plates, annular plates secured on the rim, and pneumatic rings carried by the inner edges of said plates in resting against the sides of the spring plates.

In testimony whereof I have signed my name to this specification in the presence of two subscribing witnesses.

JAMES GILBERT DAW.

Witnesses:
TREVOR THOMAS,
WILLIAM W. REES.